(12) United States Patent
Faulkner et al.

(10) Patent No.: US 11,150,432 B2
(45) Date of Patent: Oct. 19, 2021

(54) HIGH FIBER COUNT PRE-TERMINATED OPTICAL DISTRIBUTION ASSEMBLY

(71) Applicant: CORNING RESEARCH & DEVELOPMENT CORPORATION, Corning, NY (US)

(72) Inventors: Michael Todd Faulkner, Granite Falls, NC (US); Lars Kristian Nielsen, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/896,389

(22) Filed: Jun. 9, 2020

(65) Prior Publication Data

US 2020/0301091 A1    Sep. 24, 2020

Related U.S. Application Data

(62) Division of application No. 16/011,938, filed on Jun. 19, 2018, now Pat. No. 10,712,519.

(Continued)

(51) Int. Cl.
*G02B 6/44* (2006.01)
*G02B 6/38* (2006.01)

(52) U.S. Cl.
CPC ......... *G02B 6/4476* (2013.01); *G02B 6/3873* (2013.01); *G02B 6/3889* (2013.01); *G02B 6/4472* (2013.01); *G02B 6/4477* (2013.01)

(58) Field of Classification Search
CPC .. G02B 6/4476; G02B 6/3873; G02B 6/3889; G02B 6/4472; G02B 6/4477
See application file for complete search history.

(56) References Cited

U.S. PATENT DOCUMENTS 4,547,194 A * 10/1985 Moorehead ....... A61M 25/0014
285/24
5,210,810 A    5/1993 Darden et al.
(Continued)

FOREIGN PATENT DOCUMENTS

WO    2016/086881 A1    6/2016

OTHER PUBLICATIONS

International Search Report and Written Opinion of the International Searching Authority; PCT/US2018/038426; dated Nov. 5, 2018; 9 Pages; European Patent Office.

(Continued)

*Primary Examiner* — Peter Radkowski
(74) *Attorney, Agent, or Firm* — William D. Doyle

(57) ABSTRACT

Embodiments of a furcated optical fiber cable are provided. A main distribution cable has optical fibers surrounded by a cable jacket. The optical fibers are divided into at least two furcation legs. A furcation plug is located at a transition point between the main distribution cable and the at least two furcation legs. The furcation plug surrounds at least a portion of the main distribution cable and each of the at least two furcation legs. Optical connectors are provided for each of the at least two furcation legs, and each connector includes optical fibers that are spliced at a splice location to the optical fibers of the connector's respective furcation leg. The splice location is closer to the connector than to the furcation plug. A method of furcating an optical fiber cable and a pulling configuration for the furcated optical fiber cable are also provided.

8 Claims, 6 Drawing Sheets

Related U.S. Application Data

(60) Provisional application No. 62/525,970, filed on Jun. 28, 2017.

(56) References Cited

U.S. PATENT DOCUMENTS

| | | | |
|---|---|---|---|
| 5,231,688 A | 7/1993 | Zimmer | |
| 5,768,460 A | 6/1998 | Levi et al. | |
| 5,903,693 A | 5/1999 | Brown | |
| 5,966,489 A | 10/1999 | Harwell et al. | |
| 5,970,195 A | 10/1999 | Brown | |
| 6,278,831 B1 | 8/2001 | Henderson et al. | |
| 6,389,214 B1 | 5/2002 | Smith et al. | |
| 6,438,299 B1 | 8/2002 | Brown et al. | |
| 6,738,555 B1 | 5/2004 | Cooke et al. | |
| 7,270,485 B1 | 9/2007 | Robinson et al. | |
| 7,280,725 B2 | 10/2007 | Brown et al. | |
| 7,302,152 B2 | 11/2007 | Luther et al. | |
| 7,349,605 B2 | 3/2008 | Noonan et al. | |
| 7,409,127 B1 | 8/2008 | Hurley et al. | |
| 7,415,181 B2* | 8/2008 | Greenwood | G02B 6/4404 385/100 |
| 7,463,803 B2 | 12/2008 | Cody et al. | |
| 8,410,909 B2 | 4/2013 | De Jong | |
| 8,737,786 B1* | 5/2014 | Compton | G02B 6/4472 385/100 |
| 9,052,459 B2* | 6/2015 | Compton | G02B 6/2558 |
| 9,176,295 B2 | 11/2015 | Sakabe et al. | |
| 9,235,021 B2 | 1/2016 | Islam | |
| 9,535,230 B2 | 1/2017 | Newbury et al. | |
| 9,618,718 B2 | 4/2017 | Islam | |
| 10,012,802 B2 | 7/2018 | Newbury et al. | |
| 2003/0210875 A1 | 11/2003 | Wagner et al. | |
| 2005/0002621 A1* | 1/2005 | Zimmel | G02B 6/4476 385/100 |
| 2005/0053341 A1 | 3/2005 | Zimmel | |
| 2005/0276551 A1 | 12/2005 | Brown et al. | |
| 2006/0120672 A1 | 6/2006 | Cody et al. | |
| 2006/0147172 A1 | 7/2006 | Luther et al. | |
| 2006/0233506 A1 | 10/2006 | Noonan et al. | |
| 2007/0025668 A1* | 2/2007 | Greenwood | G02B 6/4494 385/103 |
| 2007/0110384 A1 | 5/2007 | Cody et al. | |
| 2008/0013888 A1* | 1/2008 | Barnes | G02B 6/3887 385/53 |
| 2008/0019646 A1* | 1/2008 | deJong | G02B 6/2558 385/99 |
| 2008/0138026 A1* | 6/2008 | Yow | G02B 6/4471 385/137 |
| 2008/0253729 A1* | 10/2008 | Gronvall | G02B 6/4472 385/137 |
| 2009/0060431 A1* | 3/2009 | Lu | G02B 6/4475 385/114 |
| 2009/0060440 A1 | 3/2009 | Wright et al. | |
| 2009/0074364 A1 | 3/2009 | Bringuier et al. | |
| 2009/0103881 A1 | 4/2009 | Gonzalez et al. | |
| 2009/0162019 A1* | 6/2009 | Lichoulas | G02B 6/3846 385/99 |
| 2010/0098386 A1* | 4/2010 | Kleeberger | G02B 6/4472 385/100 |
| 2011/0280525 A1* | 11/2011 | Marcouiller | G02B 6/2558 385/99 |
| 2011/0317968 A1* | 12/2011 | Cline | G02B 6/4471 385/111 |
| 2012/0007717 A1 | 1/2012 | Jong | |
| 2012/0106906 A1 | 5/2012 | Sakabe et al. | |
| 2012/0170899 A1* | 7/2012 | Homma | G02B 6/2558 385/99 |
| 2012/0308184 A1 | 12/2012 | Pina et al. | |
| 2013/0251319 A1* | 9/2013 | Compton | G02B 6/4495 385/99 |
| 2013/0294733 A1 | 11/2013 | Wright et al. | |
| 2014/0140662 A1 | 5/2014 | McDonald et al. | |
| 2015/0160075 A1* | 6/2015 | Taverner | G02B 6/125 374/161 |
| 2015/0260936 A1 | 9/2015 | Newbury et al. | |
| 2016/0041354 A1 | 2/2016 | Guenter et al. | |
| 2016/0327763 A1 | 11/2016 | Hurley et al. | |
| 2017/0102506 A1 | 4/2017 | Newbury et al. | |
| 2018/0024294 A1 | 1/2018 | Wang et al. | |

OTHER PUBLICATIONS

Invitation to Pay Additional Fees of the International Searching Authority; PCT/US2018/038426; dated Aug. 27, 2018; 2 Pages; European Patent Office.

European Patent Application No. 18824386.9, Partial Supplementary European Search Report dated Mar. 3, 2021; 13 pages; European Patent Office.

* cited by examiner

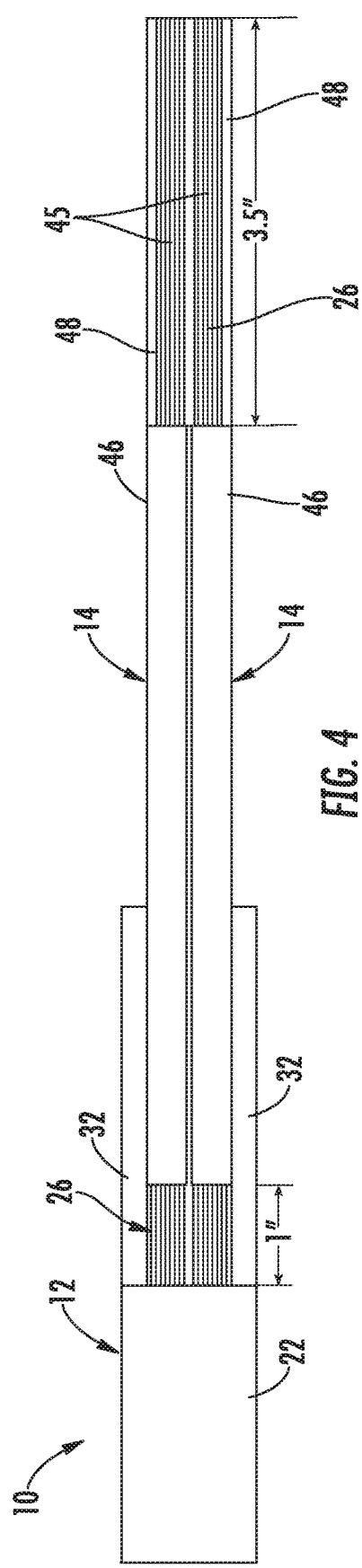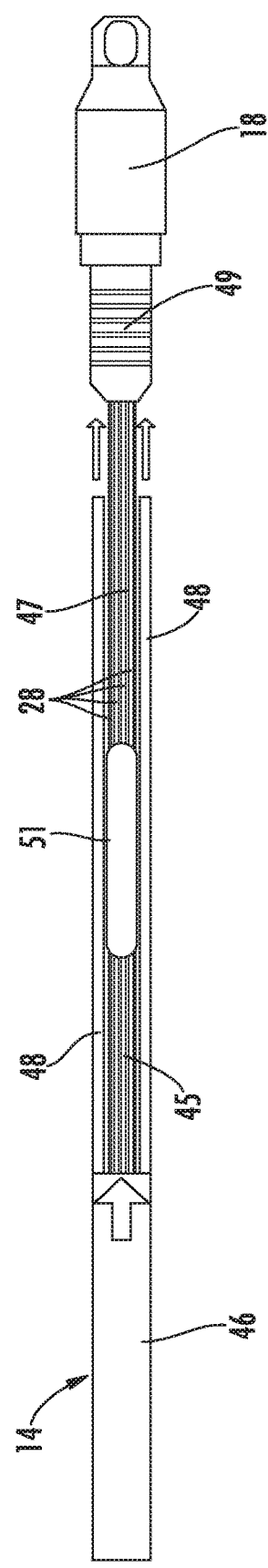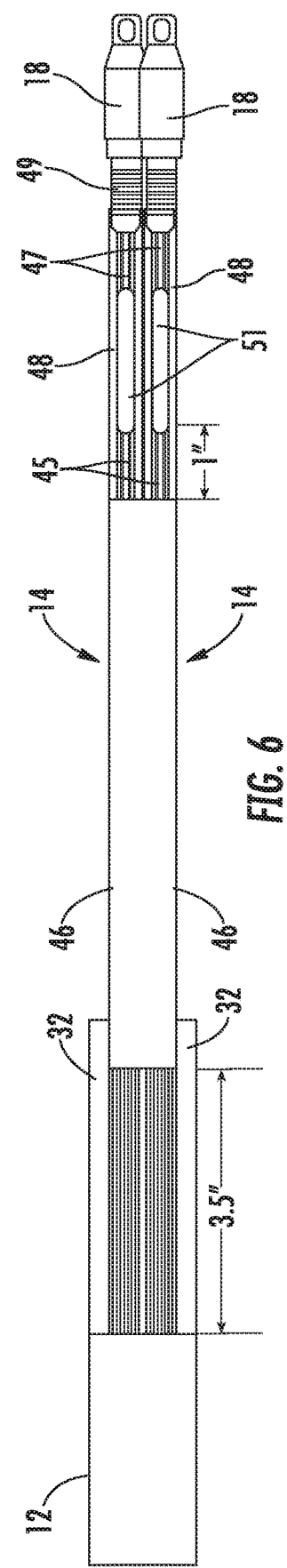
FIG. 4
FIG. 5
FIG. 6

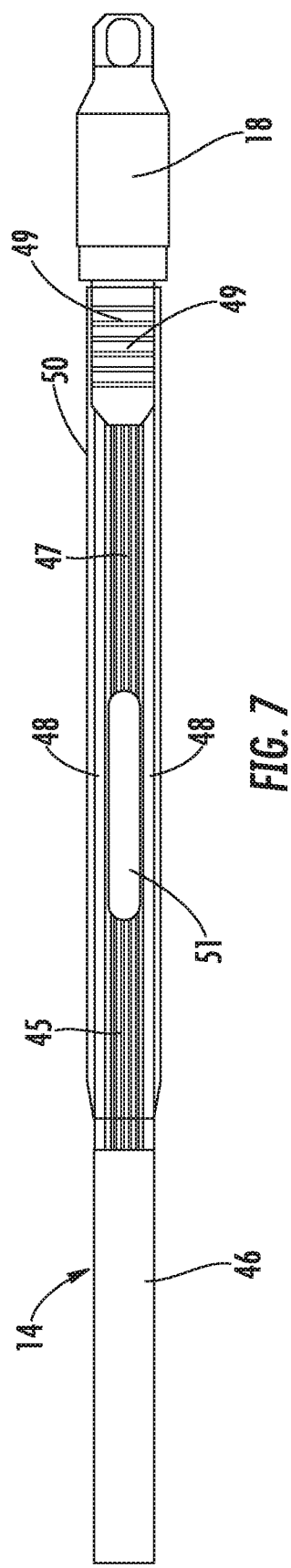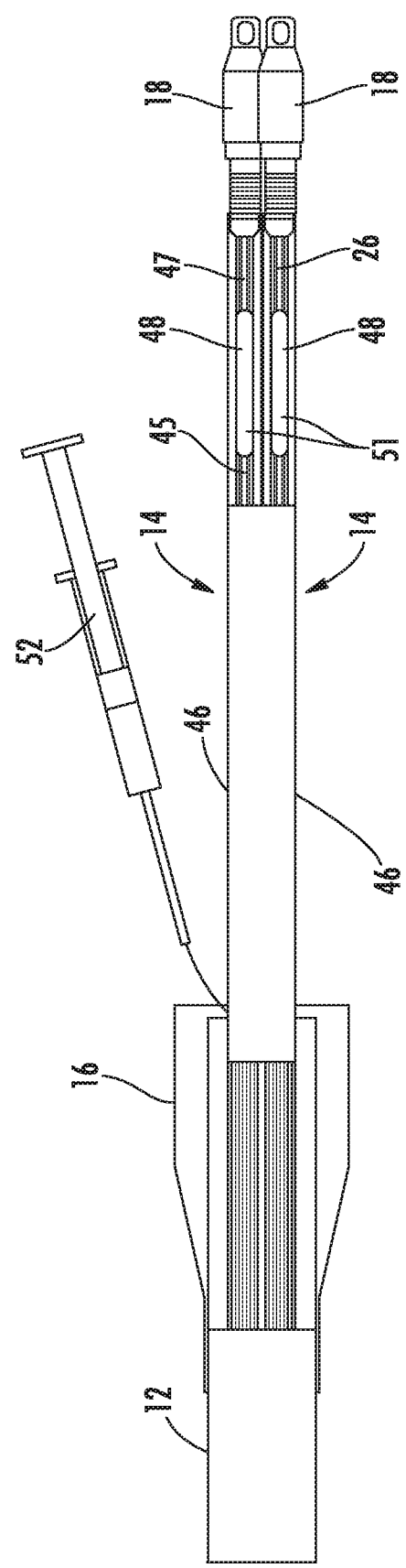

HIGH FIBER COUNT PRE-TERMINATED OPTICAL DISTRIBUTION ASSEMBLY

PRIORITY APPLICATION

This application is a divisional of U.S. application Ser. No. 16/011,938, filed Jun. 19, 2018, which claims the benefit of U.S. Provisional Application No. 62/525,970, filed on Jun. 28, 2017, the content of which is relied upon and incorporated herein by reference in its entirety.

BACKGROUND

The disclosure relates generally to optical cables and more particularly to a furcated optical fiber cable. A main optical cable line can include many branch lines that divert a portion of the optical fibers of the main optical cable to end users. Some main optical cable lines are manufactured with branch lines located in predetermined locations in order to avoid having a technician splice on branch lines in the field, which typically is costly, time-consuming, and less accurate than can be accomplished in the manufacturing facility. In branching the optical fibers, vulnerabilities tend to be created in the protective jacket of the main optical cable line at the location of the branch, for example as a result of the opening in the cable jacket created to access the fibers to create the branch. These vulnerabilities are potential sources of mechanical and environmental damage to the underlying optical fibers.

SUMMARY

In one aspect, embodiments of an optical fiber cable are provided. The optical fiber cable includes a main distribution cable having a plurality of optical fibers surrounded by a cable jacket. Further the optical fiber cable includes at least two furcation legs into which the plurality of optical fibers are divided. The at least two furcation legs transition from the main distribution cable, and each of the at least two furcation legs extends from the distribution cable along a longitudinal axis. The optical fiber cable further includes a furcation plug located at a transition point between the main distribution cable and the at least two furcation legs. The furcation plug surrounds at least a portion of the main distribution cable and each of the at least two furcation legs. Also included in the optical fiber cable is an optical connector for each of the at least two furcation legs. Each connector includes optical fibers that are spliced at a splice location to the optical fibers of the connector's respective furcation leg. Moreover, for each of the at least two furcation legs, the splice location is closer to the connector than to the furcation plug as measured in a direction along the longitudinal axis of each furcation leg.

In another aspect, embodiments of a method of furcating an optical fiber cable are provided. The method includes a step of dividing a plurality of optical fibers from a main distribution cable into at least two furcation legs. Also, a jacket of each of the at least two furcation legs is slid towards the main distribution cable so as to expose at least a three-inch portion of the optical fibers in each of the at least two furcation legs. Further, optical fibers of a connector are spliced to the exposed portion of the optical fibers of each furcation leg. The jacket of each furcation leg is then slid toward the connector, and a furcation plug is placed at a location where the main distribution cable is divided into the at least two furcation legs. Finally, the exposed portion of the optical fibers of each furcation leg is covered.

In still another aspect, embodiments of a pulling configuration for a furcated optical fiber cable are provided. The pulling configuration includes a main distribution cable including a plurality of optical fibers surrounded by a cable jacket and at least two furcation legs into which the plurality of optical fibers are divided. The at least two furcation legs transition from the main distribution cable. Further, a furcation plug is located at a transition point between the main distribution cable and the at least two furcation legs. The furcation plug surrounds at least a portion of the main distribution cable and each of the at least two furcation legs. A pulling ring encircles the main distribution cable and is located on a side of the furcation plug opposite the furcation legs. A pulling mesh surrounds the at least two furcation legs, and a pulling loop is formed at an end of the pulling mesh. The pulling loop is mechanically linked to the main distribution cable via the pulling ring such that pulling forces on the pulling loop are primarily borne by the main distribution cable.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

FIG. 4 is a detailed view of a furcation location showing a distribution cable ribbon being split into two furcation legs in an initial step of a furcation method, according to an exemplary embodiment.

FIG. 5 is a detailed view showing sliding of a furcation leg jacket forward after a splice has been made, according to an exemplary embodiment.

FIG. 6 is a detailed view of the furcation legs and main distribution cable after the furcation jackets have been slid forward to meet the connectors, according to an exemplary embodiment.

FIG. 7 is a detailed view of a furcation leg after a heat shrink wrap has been applied around the splice and exposed optical fiber ribbons, according to an exemplary embodiment.

FIG. 8 is a detailed view of the furcation plug being sealed to the main distribution cable and the furcation legs, according to an exemplary embodiment.

DETAILED DESCRIPTION

Referring generally to the figures, various embodiments of a furcated optical fiber cable are depicted. In particular, the furcated optical fiber cable includes two or more furcation legs that are spliced near to the connector instead of near to the location of the furcation. In particular, each furcation leg includes a slidable jacket that can be moved to provide enough room for fusion splicing of the optical fiber or fibers to the optical fiber or fibers of the connector. The slidable jacket creates two sections of exposed fiber in which a first section is covered with a furcation plug and a second section is covered with an overmold and/or heat shrink wrap. Furcating and splicing the cable in this way lowers the overall profile of the cable. Indeed, as compared to previous furcated optical fiber cables, the presently disclosed optical fiber cable advantageously allows for smaller sections of cable disruption resulting from furcation. Additionally, the presently disclosed optical fiber cable is able to provide staggered connectors to facilitate pulling the cable in standard two inch ducts. Further, the presently disclosed optical fiber cable utilizes a short, rigid furcation plug that provides superior anchoring for high strength pulling grips. These and other advantages will be discussed below with reference to non-limiting, exemplary embodiments. Other modifications may become apparent to one of ordinary skill in the art upon consideration of the present disclosure, and such modifications are considered to be within the scope of the present disclosure.

Figure 1:
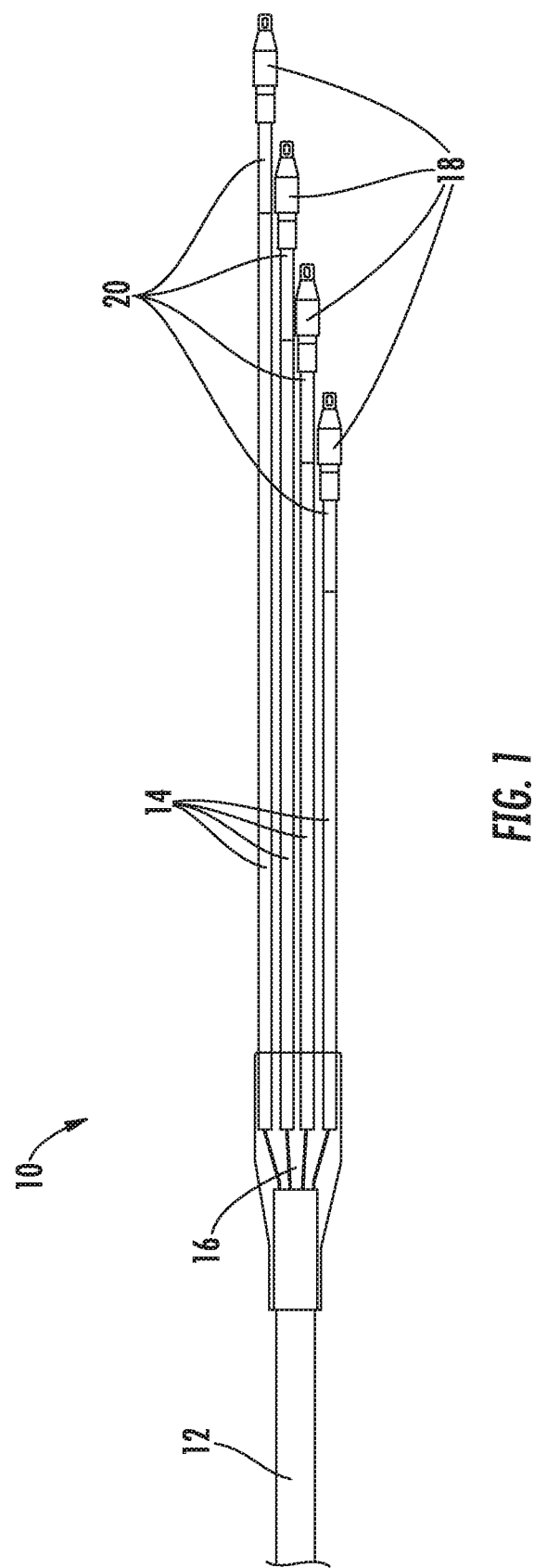
FIG. 1 depicts a furcated optical fiber cable, according to an exemplary embodiment.

With initial reference to FIG. 1, an embodiment of a furcated optical fiber cable 10 is depicted. As can be seen, the furcated optical fiber cable 10 has a main distribution cable 12 from which four furcation legs 14 extend. While four furcation legs 14 are shown for illustrative purposes, in other embodiments, the main distribution cable 12 can be furcated into, e.g., from two to twelve or more furcation legs 14. The furcation of the furcation legs 14 from the main distribution cable 12 is facilitated by a furcation plug 16. The furcation plug 16 stabilizes and protects the location of furcation such that the interior of the main distribution cable 12 is not exposed to environmental hazards. As is also depicted in FIG. 1, the furcation legs 14 have different lengths such that each leg is customized in length to cover the particular distance to the installation point. Generally, the furcation legs 14 are from three to six feet in length; however, in certain embodiments, the furcation legs are up to eighteen or twenty feet in length. In a particular embodiment, a furcated optical fiber cable 10 contains twelve furcation legs 14 that are staggered in length from three to six feet, e.g., each furcation leg 14 is three inches shorter than the successive furcation leg 14. The ability to stagger the length of the furcation legs 14 decreases the overall profile of the furcated optical fiber cable 10, which as will be discussed more fully below has advantages for pulling the cable 10 through ductwork.

Also, advantageously, each furcation leg 14 is connectorized, i.e., each furcation leg 14 is pre-terminated with a connector 18. In embodiments, the connectors 18 are a multi-fiber, mechanical transfer ("MT") connector, such as the OptiTip® MT connector (available from Corning Incorporated, Corning, N.Y.). As will be discussed more fully below, the connectors 18 are spliced to the furcation leg 14 near the end of the furcation leg 14, and the splices are protected, in part, with an overmold 20. The connectors 18 allow the furcation legs 14 to be plugged into multiport terminals, splitters, etc. without requiring in-field termination and connectorization.

Figure 2:
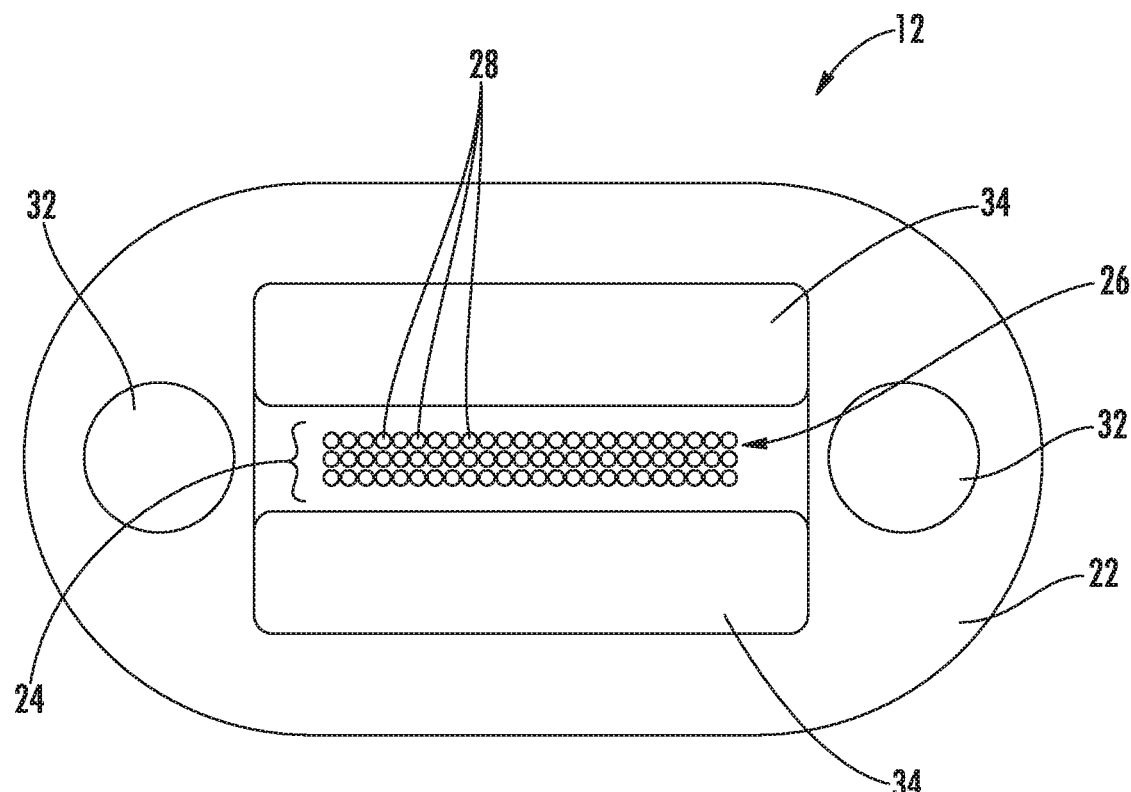
FIG. 2 depicts a cross-sectional view of the main distribution cable portion of the furcated optical fiber cable, according to an exemplary embodiment.

In order to facilitate discussion of the furcation process, the components of the main distribution cable 12 are discussed herein and depicted in FIG. 2. In FIG. 2, the main distribution cable 12 is depicted as an optical fiber ribbon cable; however, in other embodiments, the main distribution cable 12 is a loose tube cable. In particular, the main distribution cable 12 is depicted as an elongated or racetrack profile cross-section cable, such as RPX® Gel-Free Ribbon Cable (available from Corning Incorporated, Corning, N Y). The main distribution cable 12 includes an outer cable jacket, shown as outer cable jacket 22. As will be generally understood, the interior of the cable jacket 22 defines an internal region within which the various cable components discussed herein are located.

In various embodiments, cable jacket 22 is formed from an extruded thermoplastic material. In various embodiments, cable jacket 22 may be a variety of materials used in cable manufacturing such as polyethylene, medium density polyethylene, polyvinyl chloride (PVC), polyvinylidene difluoride (PVDF), nylon, polyester or polycarbonate and their copolymers. In addition, the material of cable jacket 22 may include small quantities of other materials or fillers that provide different properties to the material of cable jacket 22. For example, the material of cable jacket 22 may include materials that provide for coloring, UV/light blocking (e.g., carbon black), burn resistance/flame retardance, etc.

Contained within main distribution cable 12 is a stack 24 of optical fiber ribbons 26. Each ribbon 26 includes multiple optical transmission elements or optical waveguides, shown as optical fibers 28. As shown in FIG. 2, main distribution cable 12 includes a single stack 24 of optical fiber ribbons 26. In various embodiments, main distribution cable 12 includes at least two ribbons 26 within stack 24, and each ribbon 26 supports from four to twenty-four optical fibers 28. In the particular embodiment depicted in FIG. 2, the stack 24 contains three ribbons 26 with twenty-four optical fibers 28 in each optical fiber ribbon 26. However, in other embodiments, a different number of ribbons 26, including more or less than shown in FIG. 2, may be provided in the main distribution cable 12. Additionally, in other embodiments, a different number of optical fibers 28, including more or less than shown in FIG. 2, may be provided within each ribbon 26. Still further, in other embodiments, multiple stacks 24, each included, e.g., in separate buffer tubes, are contained in the main distribution cable 12.

In the embodiment shown, multiple strength members 32 are embedded in cable jacket 22 to provide structure and protection to the optical fibers 28 during and after installation (e.g., protection during handling, protection from the elements, protection from the environment, protection from vermin, etc.). In various embodiments, main distribution cable 12 includes two strength members 32 that are arranged on opposites sides of the main distribution cable 12. Each strength member 32 may be any suitable axial strength member, such as a glass-reinforced plastic rod, steel rod/wire, etc. Main distribution cable 12 may include a variety of other components or layers, such as a metal armor layer, helically wrapped binders, circumferential constrictive thin-film binders, water blocking tape materials, water-blocking fiber materials, etc. In particular, in the embodiment shown, main distribution cable 12 includes water swellable tape 34 above and below the stack 24 of optical fiber ribbons 26. Still further, the main distribution cable 12 can include one or more preferential tear feature and/or ripcord embedded in or underneath cable jacket 22.

Figure 3:
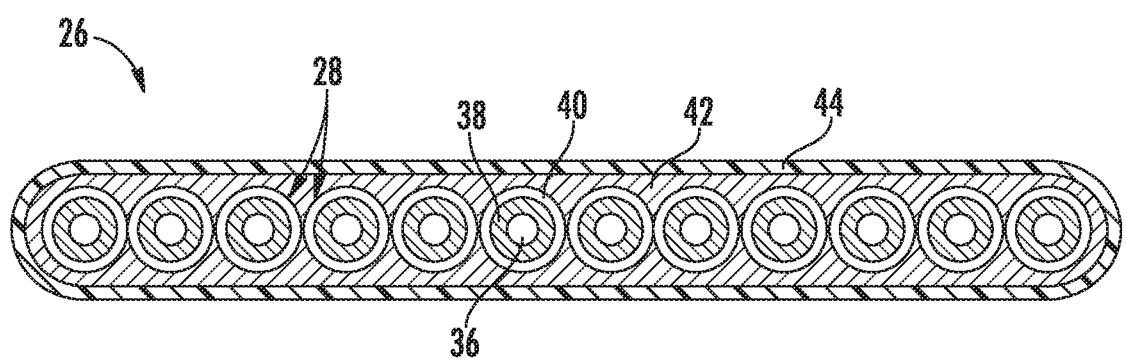
FIG. 3 depicts an optical fiber ribbon usable in a furcated optical fiber cable, according to an exemplary embodiment.

FIG. 3 depicts the construction of an exemplary embodiment of an optical fiber ribbon 26 such as might be carried in the main distribution cable 12 (shown in FIGS. 1 and 2). As can be seen, the optical fiber ribbon 26 includes a plurality of optical fibers 28. In the embodiment depicted, there are twelve optical fibers 28. Each optical fiber 28 includes a glass core and cladding region 36 along which optical signals propagate. In particular, the core is surrounded by the cladding so as to substantially keep the optical signals within the core during transmission. The core and cladding region 36 is surrounded by a primary coating 38 and a secondary coating 40. The dual layer coating, i.e., primary coating 38 and secondary coating 40, provide enhanced protection for the core and cladding region 36 against microbending-induced attenuation. In embodiments, each optical fiber 28 in the optical fiber ribbon 26 has a different color ink layer applied to the secondary coating 40 such that the optical fibers 28 can be discerned from each other during installation, splicing, repair, etc.

A polymeric matrix 42 holds the optical fibers 28 together in a parallel arrangement within the optical fiber ribbon 26. Surrounding the polymeric matrix 42 is an outer coating 44. In embodiments, ribbon identification information is printed on to polymeric matrix 42, and the outer coating 44 helps to preserve the printing from smudging, rubbing off, abrasion, etc.

Having described the main distribution cable 12 and its components, the process for furcating the optical fiber cable 10 will now be discussed with reference to FIG. 4. For clarity and ease of illustration, two furcation legs 14 are shown in the embodiment of FIG. 4; however, the process depicted is equally applicable to furcated optical fiber cables 10 having more than two furcation legs 14. Initially, the cable jacket 22 is stripped from the main distribution cable 12, revealing the optical fiber ribbons 26. Further, the optical fiber ribbons 26 are able to be further divided into furcation legs. For example, the optical fiber ribbons 26 depicted in FIG. 2 contain twenty-four optical fibers 28. In embodiments and as shown in FIG. 4, during furcation, each twenty-four fiber optical fiber ribbon 26 ("large optical fiber ribbon 26") is divided into two twelve fiber ribbons 45 ("small optical fiber ribbons 45") for each furcation leg 14.

During the step of stripping the cable jacket 22, sections of the strength members 32 of the main distribution cable are left exposed as well, which as will be discussed more fully below help to support the furcation location. In embodiments, three to five inches of the strength members 32 are left exposed after the initial stripping step.

After stripping the main distribution cable 12, a furcation leg jacket 46 is then pushed over each of the exposed small optical fiber ribbons 45. As can be seen in FIG. 4, the furcation leg jacket 46 also includes strength members 48, which are in part exposed so as to support the splice region. The furcation leg jacket 46 is of a length so that between one half and two inches of the small optical fiber ribbons 45 remain exposed at the end of the furcation leg 14 by the main distribution cable 12. Additionally, between three and five inches of the small optical fiber ribbons 45 remain exposed for performing the splice to the connectors 18 as shown in FIG. 5.

The splice to the connectors 18 is performed via mass fusion splicing. More specifically, the connectors 18 have their own optical fiber ribbon 47 extending from a crimp body 49 of the connector 18. The optical fiber ribbon 47 of the connectors 18 are spliced to the small optical fiber ribbons 45 of the furcation legs 14. In order to perform this splice, the individual optical fibers 28 are exposed by stripping the primary coating 38, secondary coating 40, polymeric matrix 42, and outer coating 44 from the optical fibers 28 (as shown in FIG. 3). As shown on a single furcation leg 14 in FIG. 5, the optical fibers 28 (also stripped) of the connectors 18 are then fused to the optical fibers 28 of the furcation leg 14 to form a splice 51 using a mass fusion splicer. Generally, mass fusion splicers feature precision cleaving, aligning, and positioning tools such that the ends of the optical fibers 28 are able to be brought into close proximity and fused together using, e.g., an electric arc, laser, gas flame, etc., to produce connections having losses of less than 0.03 dB. In embodiments, the splice 51 is located near to the connectors 18. That is, when the furcation leg 14 is unfurled or laid out along its longitudinal axis, the splice 51 is located closer to the connectors 18 than to the furcation plug 16 (as shown, e.g., in FIG. 8). In a particular embodiment, each furcation leg 14 is spliced within ten inches of a downstream end of its respective connector 18. In a more particular embodiment, each furcation leg 14 is spliced within five inches of the downstream end of its respective connector 18.

Immediately after the splicing is performed, a splice protection tube or sleeve may be slid over the splice region of the optical fibers 28. The splice protection tube is made of an inner tube and a strength member contained inside a heat shrink wrap. Once the inner tube is placed over the splice region, the heat shrink wrap is heated to seal the inner tube and strength member in place. In this way, the spliced optical fiber ribbon 26 is able to be safely handled with a substantially reduced risk of damage to the optical fibers 28.

Once the splice protection tube is in place, the furcation leg jacket 46 is pushed forward (as illustrated by the arrows in FIG. 5) toward the connector 18 until the strength members 48 contact the end of the connector 18 as shown in FIG. 6. More specifically, the strength members 48 are inserted into the crimp body 49 of the connector 18. In embodiments and as shown in FIG. 7, a heat shrink wrap 50 is placed around the splice region, including the strength members 48, and heat shrunk into place as an initial layer of environmental protection for the splice region. In embodiments, superabsorbent polymer powder and/or water swellable yarn are contained inside the heat shrink wrap 50 to prevent water from reaching the connector 18.

Next, the furcation plug 16 is molded, formed, or otherwise placed around the location of furcation as shown in FIG. 8. In an embodiment, the furcation plug 16 is an aluminum tube with a heat shrink wrap. In such embodiments, the aluminum tube furcation plug 16 is sealed with a sealant 52, such as a polyurethane, epoxy, urethane, or other hardenable resin (e.g., LOCTI 3360, available from Henkel Corporation). In another embodiment, the furcation plug 16 is a rigid, molded resin. In FIG. 8, the furcation plug 16 is placed around the exposed portion of the optical fiber ribbons 26 near the main distribution cable 12 (the exposed portion being larger as a result of the sliding forward of the furcation leg jacket 46) and around the strength members 32 of the main distribution cable 12. As mentioned above, the strength members 32 provide structure and protection for main distribution cable 12 at the location of the furcation plug 16.

Figure 9:
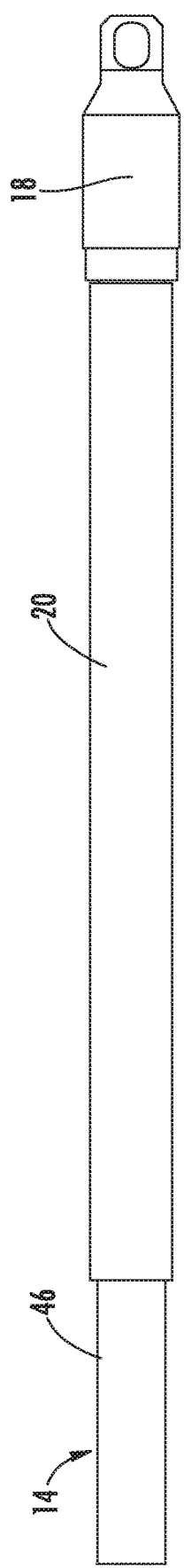
FIG. 9 is a detailed view of an overmold applied around the heat shrink wrap of a furcation leg, according to an exemplary embodiment.

In the embodiment shown in FIG. 9, the furcation legs 14 are also provided with the overmold 20 to further protect the splice region. Thus, the overmold 20 is located from directly behind the connectors 18 to from three to five inches or more behind the location of the splice. In embodiments, the overmold 20 is a polyurethane composition capable of protecting the splice region from mechanical stresses and enhancing the environmental resistance of the furcated optical fiber cable 10.

Advantageously, embodiments of the presently disclosed furcated optical fiber cable 10 enable outdoor operation and can be used with fiber counts up to or exceeding 144 fibers. In particular, the furcated optical fiber cable 10 is constructed of outdoor rated materials that, e.g., include mildewcides and are capable of withstanding extreme cold (e.g., as low as −40° C.) and extreme hot temperatures (e.g., up to 80° C.). Another advantage of the furcated optical fiber cable 10 is that the splice regions near the connectors 18 maintain flexibility, which aids in the installation process. Additionally, because the furcated optical fiber cable 10 utilizes a short, rigid furcation plug 16 at the location of furcation, use of a pulling grip that can withstand forces greater than the cable installation rating of around 600 pounds is possible.

Figure 10:
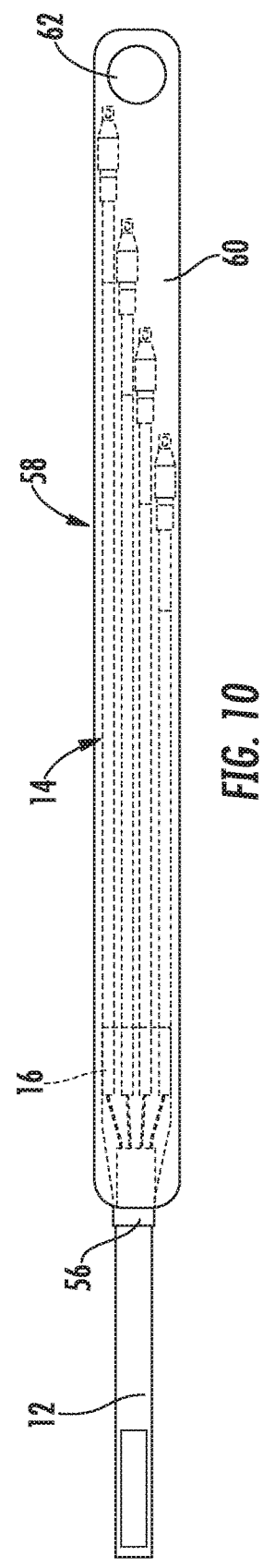
FIG. 10 depicts a first configuration for pulling a furcated optical fiber cable through ductwork, according to an exemplary embodiment.
Figure 11:
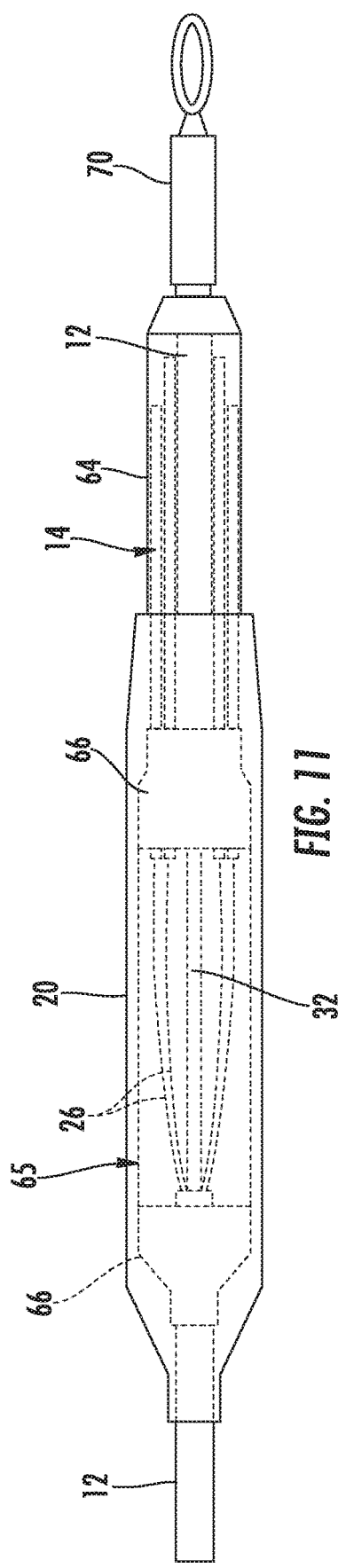
FIG. 11 depicts a second configuration for pulling a furcated optical fiber cable through ductwork, according to an exemplary embodiment.
Figure 12:
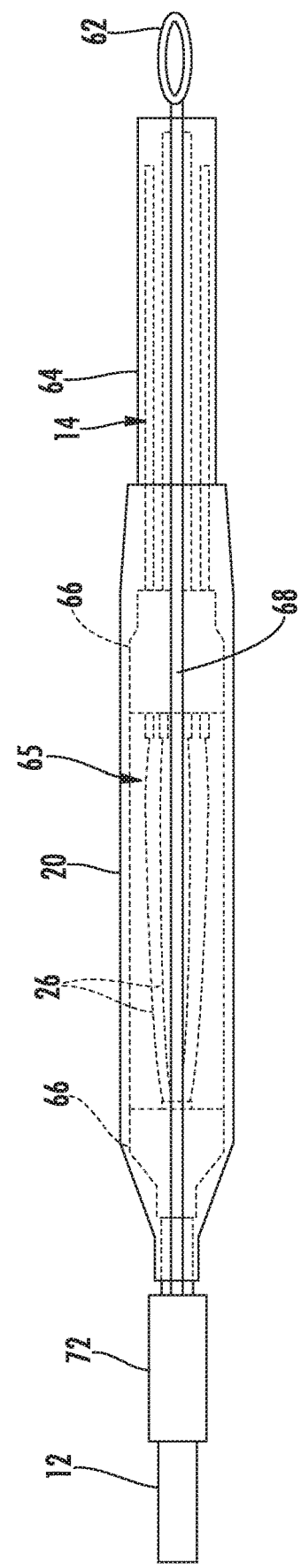
FIG. 12 depicts a third configuration for pulling a furcated optical fiber cable through ductwork, according to an exemplary embodiment.

In particular, FIGS. 10-12 depict embodiments of how the furcated optical fiber cable 10 can be configured for pulling through a duct using a pulling attachment 58. In the embodiment shown in FIG. 10, a pulling ring 56 encircles the main distribution cable 12. A high-tensile strength mesh fabric, or pulling mesh 60, is attached to the pulling ring 56 and surrounds the furcation legs 14 and furcation plug 16. At the opposite end, the pulling mesh 60 is knotted into a pulling loop 62. Advantageously, the furcated optical fiber cable 10 is able to be used with such existing pulling attachments 58. Such pulling attachments 58 are able to easily be put together and removed in the field without any special tools.

Referring now to FIG. 11, the main distribution cable 12 is stripped along a section and the optical fiber ribbons 26 are exposed. The furcation legs 14 are spliced to the exposed optical fiber ribbons 26 in the stripped section, and a protective sleeve 65 is position around the splice region. After the stripped section, the main distribution cable 12 continues for the purposes of installation, and as part of the installation, the end section of the main distribution cable 12 is removed. In particular, the central strength member or members 32 of the main distribution cable 12 are used to pull the furcated optical fiber cable 10 through ductwork.

In furtherance of this goal, the end section of the main distribution cable 12 and the exposed optical fiber ribbons 26 are contained in a corrugated protective tube 64. A heat shrink wrap 66 is then applied over at least a part of the protective sleeve 65 and over at least part of the corrugated protective tube 64. A second heat shrink wrap 66 is placed over at least a part of the other end of the protective sleeve 65 and at least a part of the main distribution cable 12. An overmold 20 is then applied over both heat shrink wraps 66, over the protective sleeve 65, and over at least a portion of the corrugated protective tube 64. A pulling grip 70 is attached to the end of the main distribution cable 12 or the corrugated protective tube 64. In an embodiment, the pulling grip 70 is a wire mesh sleeve that constricts around the main distribution cable 12 when a tensile force is applied.

Using the embodiment depicted in FIG. 11, the main distribution cable 12 is able to be pulled through an installations ductwork with commonly known cable pulling grips and methods. Additionally, the installer is able to use the installer's own pulling grip for installation. Also, the strength member or members 32 of the main distribution cable 12 carry the load of the cable per currently performed processes.

Referring now to FIG. 12, another embodiment is provided in which the furcation legs 14 are contained in a corrugated protective tube 64, similar to the previous embodiment. Also like the previous embodiment, a section of the main distribution cable 12 is stripped to expose the optical fiber ribbons 26 for splicing within a protective sleeve 65. Further, the protective sleeve 65 and the corrugated protective tube 64 are covered with a heat shrink wrap 66 and an overmold 20. However, unlike the previous embodiment, the main distribution cable 12 ends at the stripped section such that the central strength member 32 does not continue forward. In order to provide a mechanical link to the main distribution cable 12, a pulling plug 72, such as an epoxy plug, is provided behind the overmold 20, and a pulling wire 68, such as mule tape, connects the pulling ring 56 to the pulling loop 62, which in embodiments is a knot formed from the pulling wire 68. Advantageously, this embodiment provides a slimmer overall design for pulling through ductwork.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of furcating an optical fiber cable, comprising the steps of:
   dividing a plurality of optical fibers from a main distribution cable into at least two furcation legs;
   pushing a furcation jacket over each of the at least two furcation legs;
   sliding the furcation jacket of each of the at least two furcation legs towards the main distribution cable so as to expose at least a three-inch portion of the optical fibers in each of the at least two furcation legs;
   splicing optical fibers of a connector to the exposed portion of the optical fibers of each furcation leg;
   sliding the furcation jacket of each furcation leg toward the connector;
   placing a furcation plug at a location where the main distribution cable is divided into the at least two furcation legs; and
   covering the exposed portion of the optical fibers of each furcation leg.

2. The method of claim 1, wherein the furcation jacket of each of the at least two furcation legs comprises one or more strength members and wherein the step of sliding the furcation jacket of each furcation leg toward the connector further comprises sliding the furcation jacket of each furcation leg toward the connector until the one or more strength members contacts the connector.

3. The method of claim 1, wherein the step of covering the exposed portion of the optical fibers of each furcation leg further comprises covering the exposed portion of the optical fibers of each furcation leg with a heat shrink wrap.

4. The method of claim 1, wherein the step of covering the exposed portion of the optical fibers of each furcation leg further comprises covering the exposed portion of the optical fibers of each furcation leg with an overmold.

5. The method of claim 1, wherein the step of splicing a connector to the exposed portion of the optical fibers of each furcation leg is performed at a location that is nearer to the connector of each furcation leg than to the furcation plug.

6. The method of claim 1, wherein the step of dividing a plurality of optical fibers from a main distribution cable into at least two furcation legs further comprises dividing from 72 to 144 optical fibers from the main distribution cable into the at least two furcation legs.

7. The method of claim 1, further comprising the step of:
sealing the furcation plug to the main distribution cable and to each of the at least two furcation legs with a urethane sealant.

8. A pulling configuration for a furcated optical fiber cable, comprising:
a main distribution cable including a plurality of optical fibers surrounded by a cable jacket;
at least two furcation legs into which the plurality of optical fibers are divided, the at least two furcation legs transitioning from the main distribution cable;
a furcation plug located at a transition point between the main distribution cable and the at least two furcation legs, the furcation plug surrounding at least a portion of the main distribution cable and each of the at least two furcation legs;
a pulling ring encircling the main distribution cable and located on a side of the furcation plug opposite the furcation legs;
a pulling mesh surrounding the at least two furcation legs; and
a pulling loop formed at an end of the pulling mesh;
wherein the pulling loop is mechanically linked to the main distribution cable via the pulling ring such that pulling forces on the pulling loop are primarily borne by the main distribution cable.

\* \* \* \* \*